Sept. 18, 1923.

G. W. BLAKE

FLY SWATTING DEVICE

Filed Feb. 24, 1919

1,468,373

Witness
Chas. W. Stauffiger
Karl H. Butler

Inventor
George W. Blake
By
Attorneys

Patented Sept. 18, 1923.

1,468,373

UNITED STATES PATENT OFFICE.

GEORGE W. BLAKE, OF WYANDOTTE, MICHIGAN, ASSIGNOR TO THE GEORGE W. BLAKE MANUFACTURING COMPANY, OF WYANDOTTE, MICHIGAN, A CORPORATION OF MICHIGAN.

FLY-SWATTING DEVICE.

Application filed February 24, 1919. Serial No. 278,645.

*To all whom it may concern:*

Be it known that I, GEORGE W. BLAKE, a citizen of the United States of America, residing at Wyandotte, in the county of Wayne and State of Michigan, have invented certain new and useful Improvements in Fly-Swatting Devices, of which the following is a specification, reference being had therein to the accompanying drawings.

This invention aims to provide a fly swatting device constructed somewhat on the principle of a toy which will afford considerable amusement to juveniles and at the same time contribute to the extermination of flies and similar insects. The device is made to represent a fire arm having a projectile provided with a swatting or imprisoning member which is articulated relative to the projecting part of the device so that said swatting member may more or less accommodate itself to surfaces of various contours in order to swat, imprison or kill the fly or insect toward which said member is projected.

My invention further aims to provide a fly swatting device calculated not to injure the surface against which it impinges and the swatting member of the device is adapted to be forcibly projected, when released, with such impetus as to preclude the escape of any insect at which the swatting member is aimed. To forcibly actuate the swatting member of the device a spring is employed and embodied in the frame or body of a fire arm, particularly a pistol, having a trigger mechanism which controls the action of the spring.

My invention further aims to provide a device of the above type that is simple in construction, durable and highly efficient for killing or entrapping insects, and this device will be hereinafter specifically described and then claimed.

Reference will now be had to the drawings wherein there is illustrated a preferred embodiment of my invention, but it is to be understood that the body of the device is not necessarily confined to the outline of a pistol, as it may represent any other device, and the structural elements are susceptible to such changes as fall within the scope of the appended claim.

Figure 1:
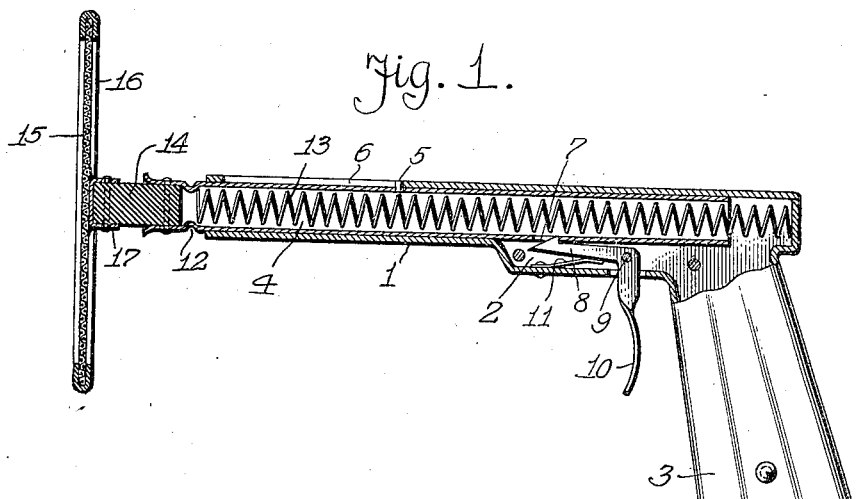
Figure 1 is a longitudinal, sectional view of the fly swatting device.
Figure 2:
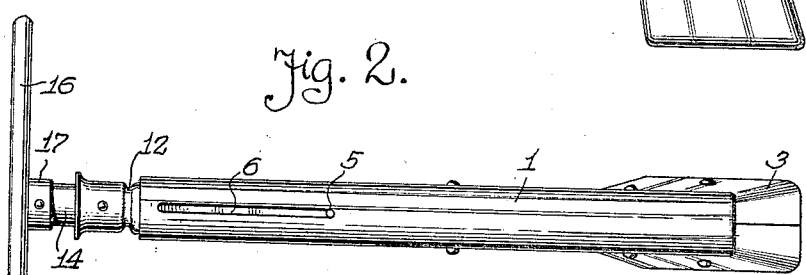
Fig. 2 is a plan of the same.
Figure 3:
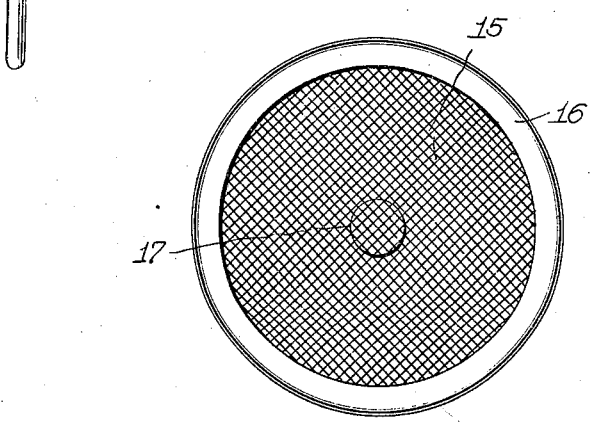
Fig. 3 is an end view of the swatting member of the device.

The reference numeral 1 denotes a pistol barrel which has the inner end thereof provided with a trigger chamber 2 and a suitable handle 3, said barrel having the front end thereof open, the rear end thereof closed, and the upper surface thereof unobstructed so that the operator of the device may sight along the barrel and accurately aim at an insect.

Slidable in the barrel 1 is a tubular projecting member 4 provided with a stop pin 5 extending into a longitudinal slot 6 in the barrel 1 to limit the reciprocable movement of the projecting member within the barrel. The projecting member also has an opening 7 to receive a trigger 8 pivotally mounted in the chamber 2, as at 9, said trigger having a finger piece 10 extending out of the chamber in proximity to the handle 3, so that said trigger may be easily pulled by a finger of the hand on the handle 3, to release the discharging member for movement in the barrel 1. The trigger 8 is normally spring pressed, as at 11, so that the end of the trigger will extend into the opening 7 of the projecting member and maintain the trigger normally cocked.

The outer end of the projecting member 4 has an annular interior bead or depressed portion 12 adapted to form a shoulder and engaging this shoulder is the outer convolution of a coiled expansion spring 13 disposed longitudinally of the tubular projecting member and engaging the inner end of the barrel 1. The expansive force of this spring is sufficient to forcibly project the member 4 outwardly from the barrel 1, until the stop pin 5 limits its outward movement. Suitably mounted in or connected to the outer end of the projecting member 4 is a yieldable universal connecting member 14, preferably in the form of a block or piece of rubber and connected to the outer end of this member is a swatting member, preferably in the form of a circular flexible woven wire screen 15 having its marginal edges bound by a casing or strip 16 that may be advantageously made of leather, rubber or yieldable material which will prevent the edges of the member 15 from marring the surface with which said member contacts. The member 15 possesses a degree of flexibility which will permit of it conforming to the contours of various surfaces and the central portion of said member may be slotted or otherwise connected to a cap 17 mounted on the end of the member 14. The member 15 may be leather, rubber or any material.

As will be understood, depressed portion 12 permanently spaces the forward end of spring 13 from member 14, the spacing remaining substantially constant in each of the various positions of the swatting member. This not only places the point of power application in proximity to member 14 but also provides for low cost of manufacture and simplicity in construction, since the element 4 is simply an open-ended tube, the depressed portion forming a means for dividing it into two communicating sections each adapted to receive elements operative in the swatting operation.

The swatting member has been shown as comparatively flat, but it is obvious that it may be made concave or of such form as to imprison or entrap an insect at which it is projected by the pistol. Besides the member 14 constituting a universal connection that permits of the swatting member assuming an angular relation relative to the axis of the barrel 1, said member permits the swatting member to yield and thus co-operates with the yieldable binding 16 of said member in preventing the member from injuring a surface with which it contacts.

The pistol portion of the device may be made of light and durable metal finished to present a neat appearance and represent an actual fire arm.

What I claim is:—

In a fly-swatting device having a casing with a contour of pistol type including grip and barrel, a swatting unit supported in and by the casing barrel and movable bodily in the direction of the barrel axis, said barrel and unit having complemental means for limiting the length of unit movement, a trigger element co-operating with the unit to temporarily retain it at the inner limit position, and an expansion spring operative to shift the unit toward its outer limiting position upon trigger actuation, said unit comprising a tubular member having a sliding bearing in the casing barrel and having an open rear end, said member having a depressed portion positioned intermediate the member ends and at a point permanently exposed said depressed portion dividing the interior of the member into front and rear communicating sections with the rear section adapted to contain the expansion spring, a resilient cushion extending into the front section, the wall of said depressed portion forming an abutment to maintain the spring and cushion in permanently spaced relation, the spacing being substantially equal in each of the positions of the unit, and a swatting element carried by the cushion.

In witness whereof I affix my signature in the presence of two witnesses.

GEORGE W. BLAKE.

Witnesses:
KARL H. BUTLER,
ANNA M. DORR.